US007215539B2

(12) United States Patent
Tanaka et al.

(10) Patent No.: US 7,215,539 B2
(45) Date of Patent: May 8, 2007

(54) DISPLAY DEVICE HAVING PANEL DISPLAY UNIT

(75) Inventors: Wataru Tanaka, Kawasaki (JP); Nagahisa Chikazawa, Kawasaki (JP); Takashi Iijima, Kawasaki (JP); Yutaka Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/447,195

(22) Filed: Jun. 6, 2006

(65) Prior Publication Data

US 2006/0227498 A1 Oct. 12, 2006

Related U.S. Application Data

(63) Continuation of application No. 10/613,025, filed on Jul. 7, 2003, now Pat. No. 7,126,560.

(30) Foreign Application Priority Data

Jul. 31, 2002 (JP) ............................. 2002-223792

(51) Int. Cl.
*G06F 1/16* (2006.01)
(52) U.S. Cl. .................. 361/683; 345/58; 361/681
(58) Field of Classification Search ................ 361/683, 361/681; 345/58, 130, 1.1; 312/681
See application file for complete search history.

(56) References Cited

U.S. PATENT DOCUMENTS 5,329,427 A 7/1994 Hogdahl 5,835,139 A 11/1998 Yun et al.
(Continued)

FOREIGN PATENT DOCUMENTS

EP 0 880 049 A1 11/1998

(Continued)

OTHER PUBLICATIONS

"Thin Head Screw for Keeping the Depth of Cross Recess," International Business Machines Corporation, vol. 436, No. 108, Aug. 2000.

(Continued)

*Primary Examiner*—Lisa Lea-Edmonds
(74) *Attorney, Agent, or Firm*—Staas & Halsey LLP

(57) ABSTRACT

A display device comprising: a housing; a plate-shaped display unit having respective side walls; and a fixing means for fixing the display unit to the housing; the fixing means including a Z-direction holding means for holding the display unit in the thickness direction and also including an X-direction holding means and a Y-direction holding means for holding the display unit in the X-direction and the Y-direction perpendicular to the X-direction; at least one of the X-direction holding means and the Y-direction holding means being composed of wall sections, which are opposed to each other, of the housing adjacent to respective side walls of the display unit; a protruding section being formed which protrudes from the side wall of the display unit to the wall section; the wall section having a cutout engaging with the protruding section at a position of the wall section corresponding to the protruding section; and the other of the X-direction holding means and the Y-direction holding means being composed by engagement of the protruding section with the cutout.

13 Claims, 10 Drawing Sheets

U.S. PATENT DOCUMENTS

| | | | |
|---|---|---|---|
| 5,872,606 A | 2/1999 | Kim | |
| 5,926,237 A | 7/1999 | Yun et al. | |
| 5,946,061 A | 8/1999 | Kurihara et al. | |
| 6,002,457 A | 12/1999 | Yun et al. | |
| 6,002,582 A * | 12/1999 | Yeager et al. | 361/681 |
| 6,020,942 A | 2/2000 | Yun et al. | |
| 6,144,423 A | 11/2000 | Kim | |
| 6,310,767 B1 | 10/2001 | Spear et al. | |
| 6,381,124 B1 | 4/2002 | Whitcher et al. | |
| 6,411,501 B1 * | 6/2002 | Cho et al. | 361/681 |
| 6,430,039 B2 * | 8/2002 | Nakajima et al. | 361/681 |
| 6,494,429 B2 | 12/2002 | Tajima | |
| 6,525,790 B1 * | 2/2003 | Kan-o | 349/58 |
| 6,542,206 B1 | 4/2003 | Saito | |
| 6,654,078 B1 | 11/2003 | Kato et al. | |
| 6,671,012 B1 | 12/2003 | Tanaka | |
| 2002/0015118 A1 | 2/2002 | Kashimoto | |
| 2003/0147023 A1 * | 8/2003 | Kang | 349/58 |

FOREIGN PATENT DOCUMENTS

| | | |
|---|---|---|
| EP | 1 052 536 A2 | 11/2000 |
| EP | 1 052 536 A3 | 11/2000 |
| JP | 4-338717 | 11/1992 |
| JP | 9-030463 | 2/1997 |
| JP | 10-282899 | 10/1998 |
| JP | 10-333585 | 12/1998 |

OTHER PUBLICATIONS

European Search Report and Annex dated Mar. 7, 2005.
European Search Report, dated Aug. 28, 2006, for related European Patent Application No. EP 06 00 8627.

* cited by examiner

DISPLAY DEVICE HAVING PANEL DISPLAY UNIT

This application is a Continuation of application Ser. No. 10/613,025, filed Jul. 7, 2003 now U.S. Pat. No. 7,126,560, allowed, and claims the benefit of Japanese Application No. 2002-223792, filed Jul. 31, 2002.

BACKGROUND OF INVENTION

1. Field of the Invention

The present invention relates to a display device, such as that in an information processor having a display unit. More particularly, the present invention relates to a mounting structure by which a panel display unit is mounted on a housing of a display device provided in an information processor.

Concerning information processors, there is a requirement to reduce the size and weight. Especially, in a liquid crystal display unit having the functions of a display device and an input device, there is demand of reducing the size when the liquid crystal display unit is mounted on the housing.

2. Description of the Related Art

Conventionally, an information processor, which will be referred to as a computer hereinafter, such as a portable type or notebook type word processor or personal computer includes: a main body having an input device such as a keyboard; and a display section capable of being opened and closed with respect to the main body. In this case, the display section is usually composed of a liquid crystal display unit. This liquid crystal display unit is fixed to a housing which composes a cover.

It is conventional that the liquid crystal display unit is fixed to the housing in such a manner that the liquid crystal display unit is fixed to a front cover of the housing with a fixing means such as screws arranged at four corners of the rectangular panel-like liquid crystal display unit. When the above structure is adopted, it is difficult to reduce the size of the display device because it is necessary to provide a space, in which screws are arranged, between the inside of the housing composing the cover and the side of the rectangular liquid crystal display unit. Especially, it is difficult to extend a region of the display portion of the liquid crystal display unit with respect to a frame portion of the cover.

Especially, in the case of a portable note type computer, there is a requirement to reduce the thickness of the computer under the condition that the display section is closed to the main body. Accordingly, not only the main body but also the display section must be made as thin as possible. Therefore, a space in the thickness direction between the liquid crystal display unit and the housing must be made as small as possible. However, since the liquid crystal display unit must be fixed to the housing portion of the cover (display section cover), the size in the width direction of the device is extended. Therefore, from the viewpoint of reducing the thickness of the display section, it not preferable that fixing members such as bolts are arranged between the liquid crystal display unit and the housing on the reverse side of the liquid crystal display unit and between the upper edge face or side edge face of the liquid crystal display unit and the walls of the housing.

A prior art is disclosed in Japanese Unexamined Patent Publication No. 10-282899 which describes a mounting hole for fixing a fixing member such as a screw used when a liquid crystal display device is fixed to a peripheral device. According to this Japanese Unexamined Patent Publication, when the mounting hole is formed not on the front of the liquid crystal display device but on the side, without arranging a screw forming section on the front of the liquid crystal display device, the liquid crystal display device is fixed to the peripheral device and an area of the liquid crystal display device is extended.

Japanese Unexamined Patent Publication No. 10-333585 discloses a liquid crystal display module fixing device for a computer in which an upper sash, in which the crystal display module is arranged, is pivotally fixed to a lower sash, the liquid crystal display module fixing device characterized in that: a fixing mount is fixed on the inside of the lower sash; and the upper sash and the liquid crystal display module are fixed to each other with screws via an arm pivotally fixed to one side end portion of the fixing mount by a hinge which is connected with the fixing mount.

There is a demand of reducing the size and weight of an information processor. Especially, there is a demand of reducing the size of a liquid crystal display unit, which has both functions, as a display device and as an input device, when it is mounted on a housing.

SUMMARY OF THE INVENTION

It is a first object of the present invention to provide a display device in which a space formed between the display unit and the housing in the case of mounting the display unit on the housing is decreased to as small as possible and, on the other hand, especially, a region of the display portion of the liquid crystal display unit with respect to a frame portion of the housing is increased to as large as possible.

It is a second object of the present invention to provide a display device in which the display unit can be simply mounted on the housing at a low manufacturing cost.

According to the present invention, there is provided a display device comprising: a housing; a plate-shaped display unit having respective side walls; and a fixing structure for fixing the display unit to the housing; the fixing structure including a Z-direction holding member for holding the display unit in the thickness direction and also including an X-direction holding means and Y-direction holding means for holding the display unit in the X-direction and the Y-direction perpendicular to the X-direction; at least one of the X-direction holding member and the Y-direction holding member being composed of wall sections, which are opposed to each other, of the housing adjacent to respective side walls of the display unit; a protruding section being formed which protrudes from the side wall of the display unit to the wall section; the wall section having a cutout engaging with the protruding section at a position of the wall section corresponding to the protruding section; and the other of the X-direction holding member and Y-direction holding member being composed by engagement of the protruding section with the cutout.

The protruding section is a pawl section in which a portion of a plate fixed to the side wall of the display unit is protruded to the wall section side, and the pawl section is engaged with the cutout.

The plate is composed of a metal fitting, the section of which is an L-shape, and an L-shape portion of the metal fitting composes the pawl section.

The protruding section is a head portion of a screw which is screwed into the side wall of the display unit, the cutout is a U-shaped groove provided in the wall section, and the head portion of the screw is loosely engaged in the U-shaped groove.

The thickness of the head portion of the screw in the axial direction, which is engaged in the U-shaped groove, is identical with or smaller than the thickness of a portion of the wall section in which the U-shaped groove is provided so that the head portion of the screw does not protrude from an opposite side face of the wall section.

The housing is provided with a frame-shaped front cover surrounding a periphery of the display unit, and the wall section is composed of a rising wall of the front cover.

According to another aspect of the present invention, there is provided a housing; a plate-shaped display unit having respective side walls; and a fixing structure for fixing the display unit to the housing; the fixing structure including a Z-direction holding member for holding the display unit in the thickness direction and also including an X-direction holding member and Y-direction holding member for holding the display unit in the X-direction and the Y-direction perpendicular to X-direction; at least one of the X-direction holding member and the Y-direction holding member being composed of wall sections, which are opposed to each other, of the housing adjacent to respective side walls of the display unit; a protruding section being formed which protrudes from the side wall of the display unit to the wall section; the wall section having a through-hole engaging with the protruding section at a position of the wall section corresponding to the protruding section; and the Z-direction holding member and the other of the X-direction holding member and the Y-direction holding member being composed by engagement of the protruding section with the through-hole.

The protruding section is a pawl section in which a portion of a plate fixed to the side wall of the display unit is protruded to the wall section side, and the pawl section is engaged in the through-hole.

The protruding section is composed of a head section of a screw which is screwed in the display unit, and the head section of the screw is loosely engaged in the through-hole provided in the wall section.

The thickness of the head portion of the screw in the axial direction, which is engaged in the through-hole, is identical with or smaller than the thickness of a portion of the wall section in which the through-hole is provided so that the head portion of the screw does not protrude from an opposite side face of the wall section.

The plate is fixed to the wall section with a screw at a position where the plate does not overlap the wall section.

The housing is provided with a frame-shaped front cover surrounding a periphery of the display unit, and the wall section is composed of a rising wall of the front cover.

BRIEF DESCRIPTION OF THE DRAWINGS

In the drawings:

FIGS. 2–4 show a first embodiment of the present invention, wherein FIG. 2 is a perspective view thereof, FIG. 3 is a view showing portion A of FIG. 2 in detail, and FIG. 4 is a sectional view showing a fixing portion of the first embodiment;

FIGS. 5–7 show a second embodiment of the present invention, wherein FIG. 5 is a perspective view thereof, FIG. 6 is a view showing portion B of FIG. 5 in detail, and FIG. 7 is a sectional view showing a fixing portion;

FIGS. 8–10 show a third embodiment of the present invention, wherein FIG. 8 is a perspective view thereof, FIG. 9 is a view showing portion C of FIG. 8 in detail, and FIG. 10 is a sectional view showing a fixing portion of the third embodiment;

FIGS. 11–14 show a the fourth embodiment of the present invention, wherein FIG. 11 is a perspective view thereof, FIG. 12 is a view showing portion D of FIG. 11 in detail, and FIG. 13 is a sectional view showing a fixing portion of the fourth embodiment, and FIG. 14 is an exploded view of the fourth embodiment; and FIGS. 15–17 show a comparative example for comparing with the embodiment of the present invention, wherein FIG. 15 is a perspective view thereof, FIG. 16 is a view showing portion E of FIG. 15 in detail, and FIG. 17 is a sectional view showing a fixing portion.

DETAILED DESCRIPTION OF THE PREFERRED EMBODIMENTS

Referring now to the accompanying drawings, embodiments of the present invention will be explained as follows.

Figure 1:
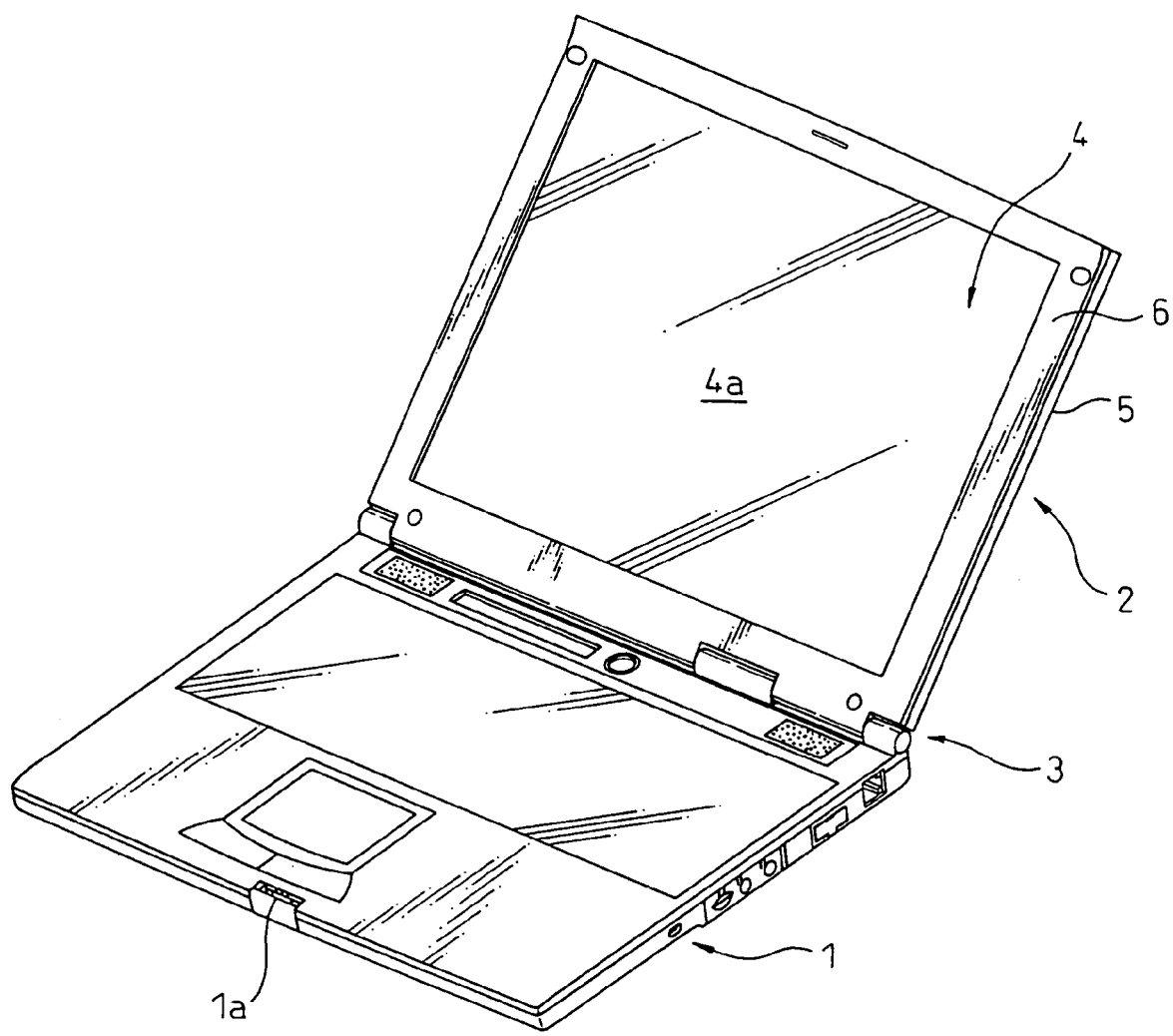
FIG. 1 is an appearance view of a portable type computer having a display device of the present invention.

FIG. 1 is an appearance view of a display device of the present invention, that is, FIG. 1 is an appearance view of a portable type computer in which a mounting structure of a liquid crystal display unit of the present invention is adopted. The portable type computer includes: a main body provided with a keyboard, pointer and so forth, and a cover section 2 provided with a liquid crystal display unit 4, although the detail of these elements are not shown in the drawing. The cover section 2 is pivotally attached to the main body 1, so that the cover section 2 can be turned so that it is opened and closed with respect to the main body 1. In other words, the cover section 2 can be opened from the main body 1 when this portable type computer is used, and the cover section 2 can be closed to the main body 1 when this portable type computer is not used. When the cover section 2 is closed, it is locked to the main body 1 by the lock member 1a provided on the main body 1 side. When the cover section 2 is to be opened, the lock member 1a is first released and then the cover section 2 is opened from the main body 1.

A housing which composes the cover section 2 includes a back cover 5 and front cover 6, and the liquid crystal display unit 4 is fixed in such a manner 1 that it is interposed between the back cover 5 and the frame-shaped front cover 6.

An entire profile of the liquid crystal display unit 4 is a rectangular, flat, plate shape. A periphery of the liquid crystal display face 4a, which occupies the largest part on the surface side of the liquid crystal display unit 4, is surrounded by the front cover 6, the profile of which is a rectangular frame shape. The back cover 5 is arranged on the reverse side so as to cover all of the reverse side of the liquid crystal display unit 4.

As described above, the cover section 2 is composed of the back cover 5, liquid crystal display unit 4 and front cover 6. In this specification, the terminology is defined as follows. When the liquid crystal display face 4a is viewed while the liquid crystal display unit 4 is being used so that the cover section 2 is opened from the main body 1, the hinge 3 side of the liquid crystal display face 4a is referred to as a "lower section", the opposite side to the lower section is referred to as an "upper section", the back cover 5 side of the liquid crystal display unit 4 is referred to as a "back face", and the front cover 6 side of the liquid crystal display unit 4 is referred to as a "front face". Concerning the surface direction of the liquid crystal display unit 4, the lateral direction is referred to as "direction X", the vertical direction is referred to as "direction Y", and the thickness direction of the liquid crystal display unit 4 is referred to as "direction Y".

The back cover 5 and the front cover 6 are made of, for example, magnesium alloy and are formed by means of die casting.

Figure 2:
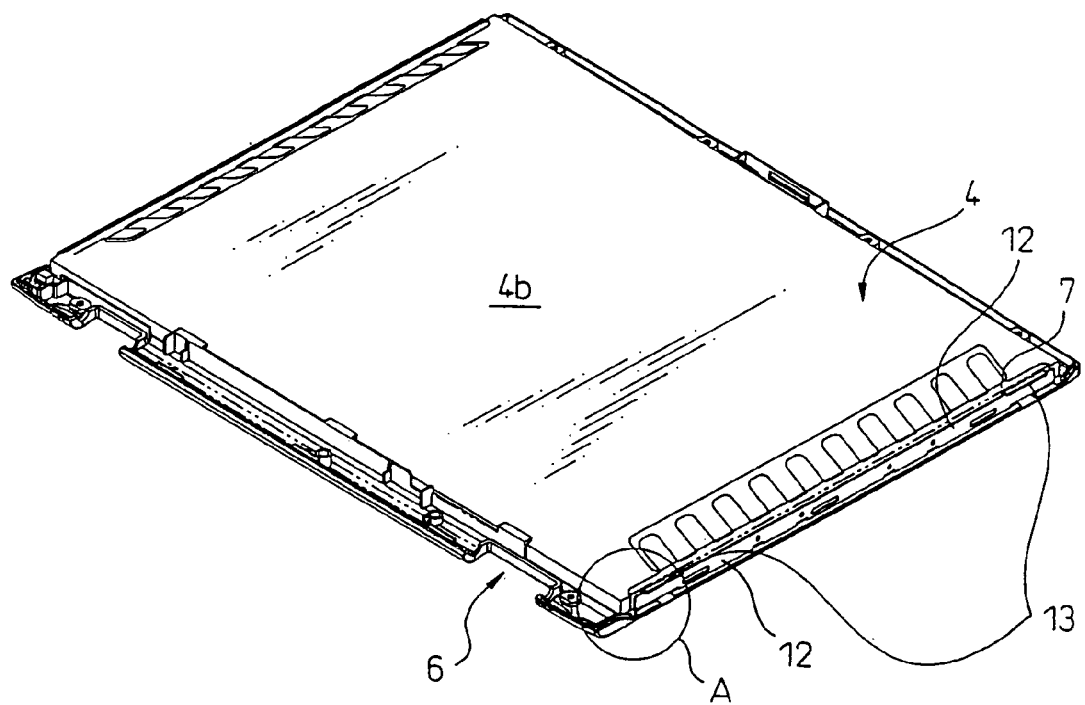
Figure 3:
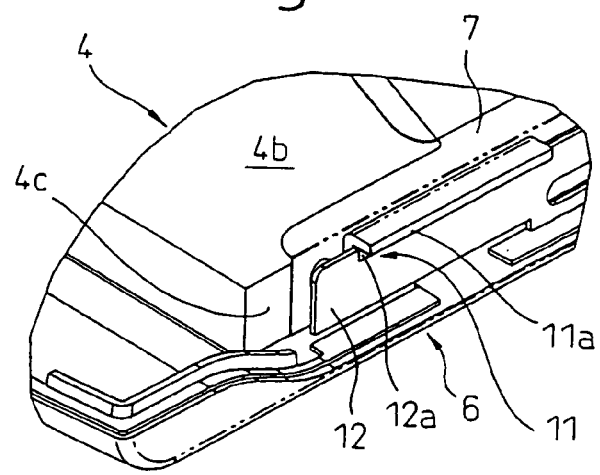
Figure 4:
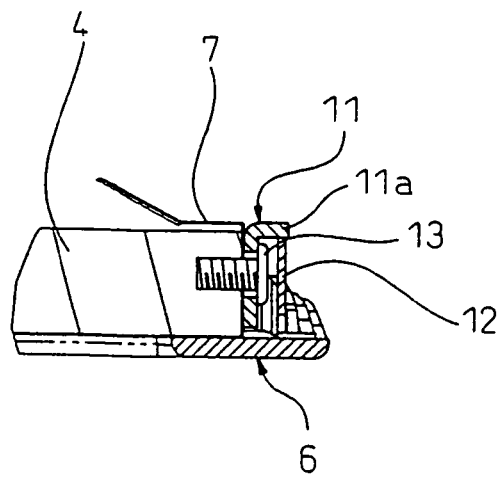

FIGS. 2 to 4 are views showing a first embodiment of the present invention. FIG. 2 is a perspective view showing a state in which the liquid crystal display unit 4 is fixed to the front cover 6, wherein the view is taken from the back side 4*b* of the liquid crystal display unit 4. FIG. 3 is an enlarged perspective view showing a fixing portion indicated by reference mark A in FIG. 2. FIG. 4 is a sectional view of the fixing portion.

On the front cover 6 composing one portion of the housing, there are provided a pair of rising wall sections 12 which are opposed to the respective side walls of the liquid crystal display unit 4 in such a manner the rising wall sections 12 are adjacent to the respective side walls of the liquid crystal display unit 4. Accordingly, the liquid crystal display unit 4 can not be moved in the lateral direction (direction X) in the plane direction due to the pair of rising wall sections 12.

L-shaped metal fittings 11, which are made of an appropriate metal, the sections of which are L-shaped, the number of which is at least two, one arranged on the right and the other arranged on the left, are fixed to respective side walls 4*c* of the liquid crystal display unit 4 by the screws 13, wherein the flexible plates 7, which are functional parts (for example, the flexible plates 7 connect the liquid crystal display unit 4 with the ground), are interposed between the side walls 4*c* and the L-shaped metal fittings 11. In this case, it is most preferable that the number of the L-shaped metal fittings 11 is four, wherein the four L-shaped metal fittings 11 are respectively arranged on the right and the left and on the hinge side and the forward end side, respectively. The width of each L-shaped metal fitting 11 is a little smaller than the thickness of the side 4*b* of the liquid crystal display unit 4. On the back side 4*b* of the liquid crystal display unit 4, each L-shaped metal fitting 11 is bent into an L-shape onto the wall section 12 side of the front cover 6. The protruding portion of the L-shaped metal fitting 11 is defined as a pawl section 11*a*.

On the other hand, at a position on the wall section 12 corresponding to the pawl section 11*a* of each L-shaped metal fitting 11, there is provided a groove or cutout 12*a* with which the pawl section 11*a* can be engaged. When the pawl section 11*a* is engaged with the groove or the cutout 12*a* of the wall section 12, the liquid crystal display unit 4 cannot be moved in the vertical direction (direction Y).

Figure 5:
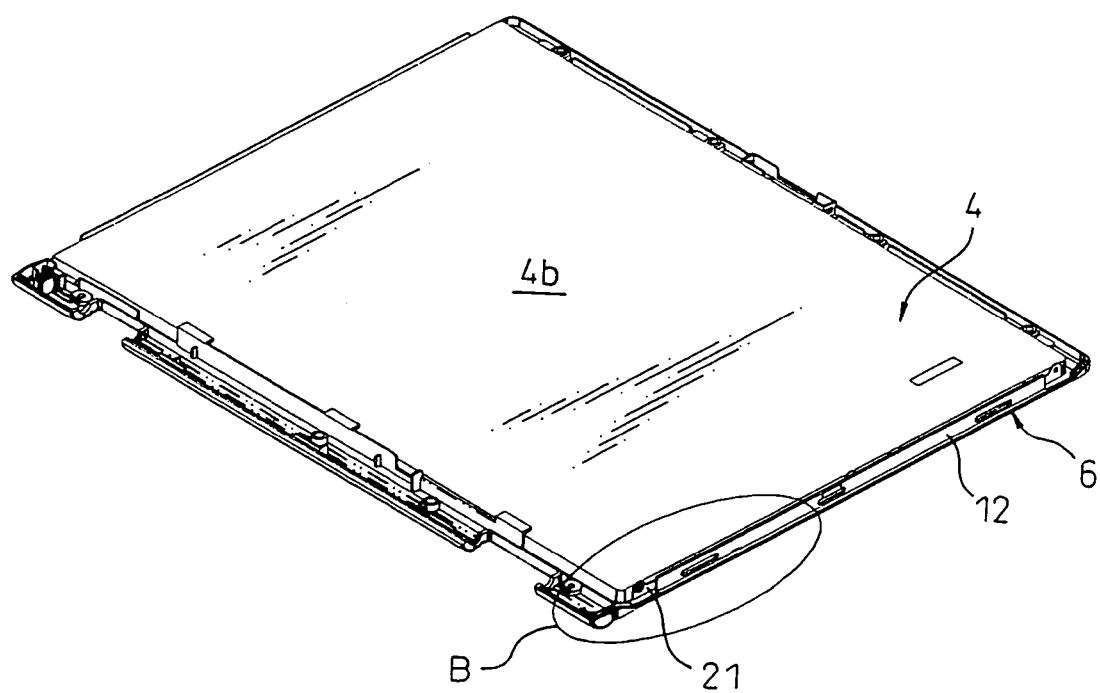
Figure 6:
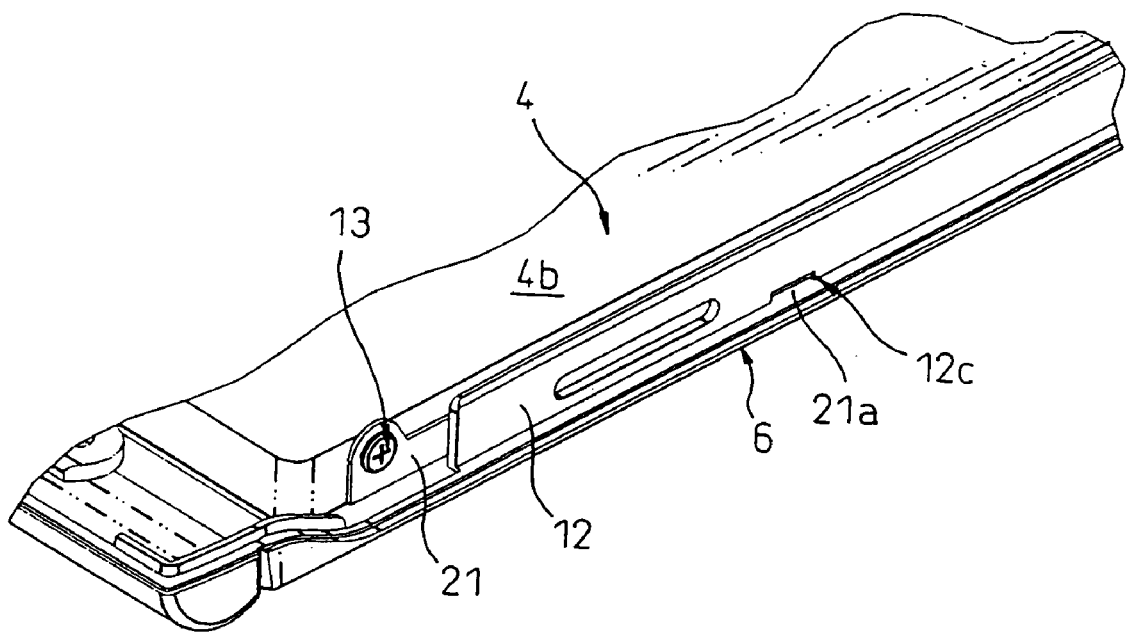
Figure 7:
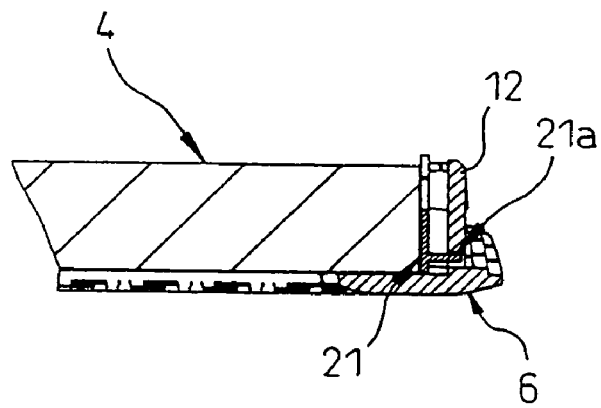

FIGS. 5 to 7 are views showing a second embodiment of the present invention. FIG. 5 is a perspective view showing a state in which the liquid crystal display unit 4 is fixed to the front cover 6, wherein the view is taken from the back side 4*b* of the liquid crystal display unit 4. FIG. 6 is an enlarged perspective view showing a fixing portion indicated by reference mark B in FIG. 5. FIG. 7 is a sectional view of the fixing portion.

In the same manner as those of the first embodiment, on the front cover 6 composing one portion of the housing, there are provided a pair of wall sections 12 which are opposed to walls on both sides of the liquid crystal display unit 4 in such a manner the rising wall sections 12 are adjacent to the respective side walls of the liquid crystal display unit 4. Accordingly, the liquid crystal display unit 4 cannot be moved in the lateral direction (direction X) on the flat face due to the pair of rising wall sections 12. An upper face (upper face shown in FIG. 4) of the pawl section 11*a* comes into contact with the back face of the back cover 5 (shown in FIG. 1), so that movement in the Z direction can be restricted.

On the respective side walls 4*c* of the liquid crystal display unit 4, the plate-shaped metal fittings 21 are fixed by the screws 13. The length of the plate-shaped metal fittings 21 is a little smaller than the length of the respective side walls of the liquid crystal display unit 4, and the width is smaller than the thickness of the liquid crystal display unit 4.

At a position close to the surface 4*a* side of the liquid crystal display unit 4 (on the back side in FIGS. 5 to 7), a part of this metal fitting 21 protrudes onto the wall section 12 side of the front cover 6, so that the pawl section 21*a* is formed.

At a position of the wall section 12 corresponding to the position of the pawl section 21*a*, there is provided a through-hole 12*c* in which the pawl section 21*a* is engaged. When the pawl section 21*a* is engaged in the through-hole 12*c*, the liquid crystal display unit 4 cannot be moved in the thickness direction (direction Z) and the vertical direction (direction Y).

As shown in FIG. 6, the metal fitting 21 is fixed to the side wall 4*c* of the liquid crystal display unit 4 by the screw 13 at the respective end portions which are not covered with the wall section 12.

Figure 8:
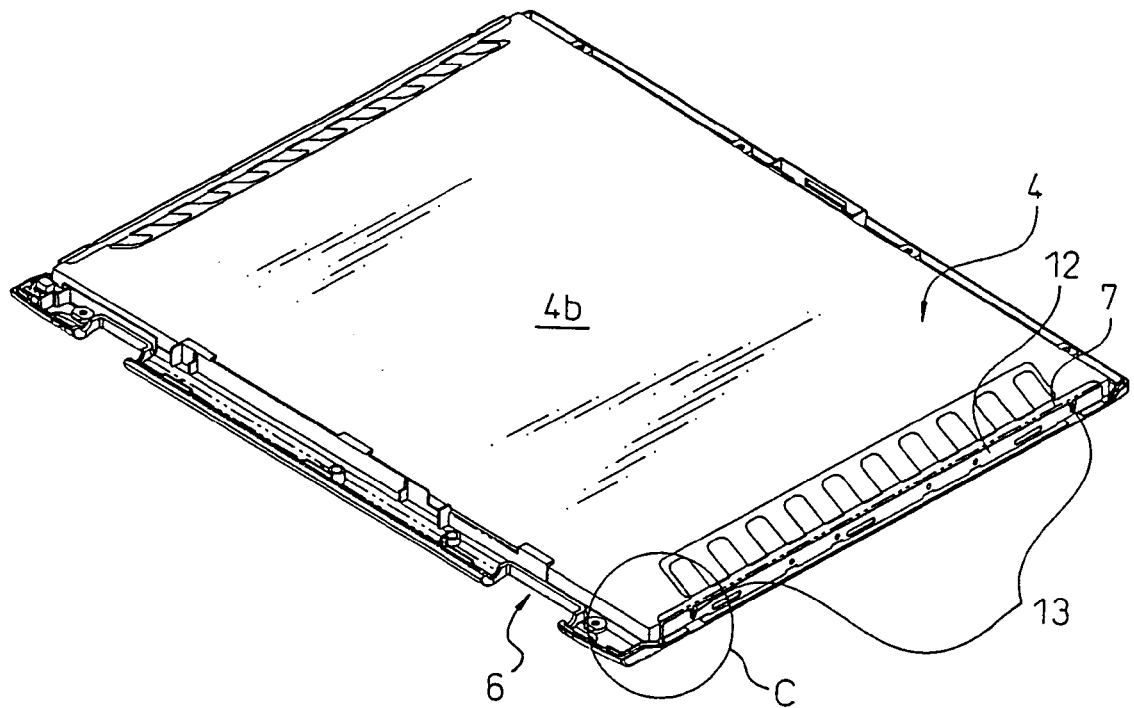
Figure 9:
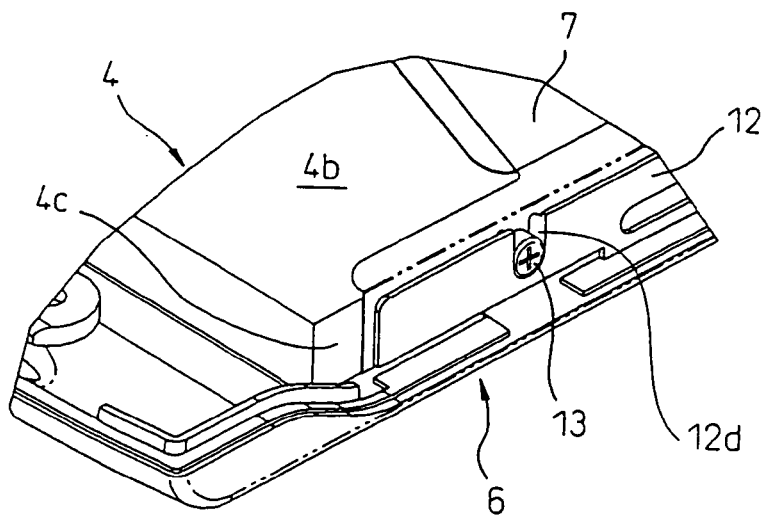
Figure 10:
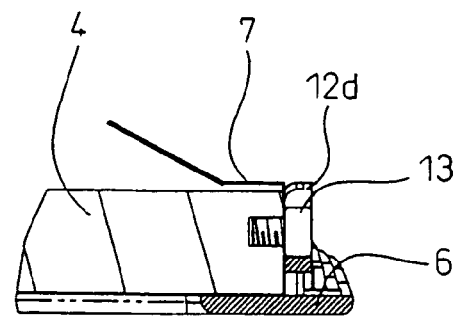

FIGS. 8 to 10 are views showing the third embodiment of the present invention. FIG. 8 is a perspective view showing a state in which the liquid crystal display unit 4 is fixed to the front cover 6, wherein the view is taken from the back side of the liquid crystal display unit 4. FIG. 9 is an enlarged perspective view showing a fixing portion indicated by reference mark C in FIG. 8. FIG. 10 is a sectional view of the fixing portion.

In the same manner as that of the first and the second embodiment, on the front cover 6 composing one portion of the housing, there are provided a pair of wall sections 12 which are opposed to walls on the respective sides of the liquid crystal display unit 4 in such a manner the rising wall sections 12 are adjacent to the respective side walls of the liquid crystal display unit 4. Accordingly, the liquid crystal display unit 4 can not be moved in the lateral direction (direction X) on the plane by the pair of rising wall sections 12.

Four screws 13, which are respectively arranged on the right and the left and on the upper and the lower side, respectively, are screwed to the respective side walls 4*c* of the liquid crystal display unit 4 while the flexible plates 7, which are functional parts, are being interposed between the screws 13 and the respective side walls 4*c*. In the same manner as that of a common screw, the screw stem portion of each screw 13 is screwed onto the side of the liquid crystal display unit 4, and only the head portion of each screw 13 is protruded from the side face of the liquid crystal display unit 4.

At a position in the wall section 12 of the front cover 6 corresponding to the head portion of the screw 13, there is provided a U-shaped groove 12*d*. The head portion of this screw 13 is loosely engaged in this U-shaped groove 12*d*. Specifically, the wall section 12 is not fastened by the screws 13 together with the flexible plate 7 but the head portion of the screw 13 is only engaged in the U-shaped groove 12*d*. Accordingly, a movement of the liquid crystal display unit 4 in the vertical direction (direction Y) on the plane is prevented by the pair of wall sections 12. Further, when the flexible plate 7 comes into contact with the back cover 5

(shown in FIG. 1), a movement of the liquid crystal display unit 4 in the Z direction can be prevented.

The thickness of the head portion of the screw 13 in the axial direction, which is loosely engaged in the U-shaped groove 12d, is identical with or smaller than the thickness of the wall section 12 of the front cover 6 in which the U-shaped groove 12d is provided. Due to the foregoing, the head portion of the screw 13 is not protruded outside from the face on the opposite side to the wall section 12. In this case, the diameter of the head portion of the screw 13 may be identical with or smaller than the diameter of the screw stem. However, when the diameter of the head portion of the screw 13 is larger than the diameter of the screw stem, manufacturing can be advantageously performed. The reason is that when the screw 13 is screwed into the liquid crystal display unit 4, the head portion functions as a stopper, so that engaging it with the groove 12d can be easily carried out.

Figure 11:
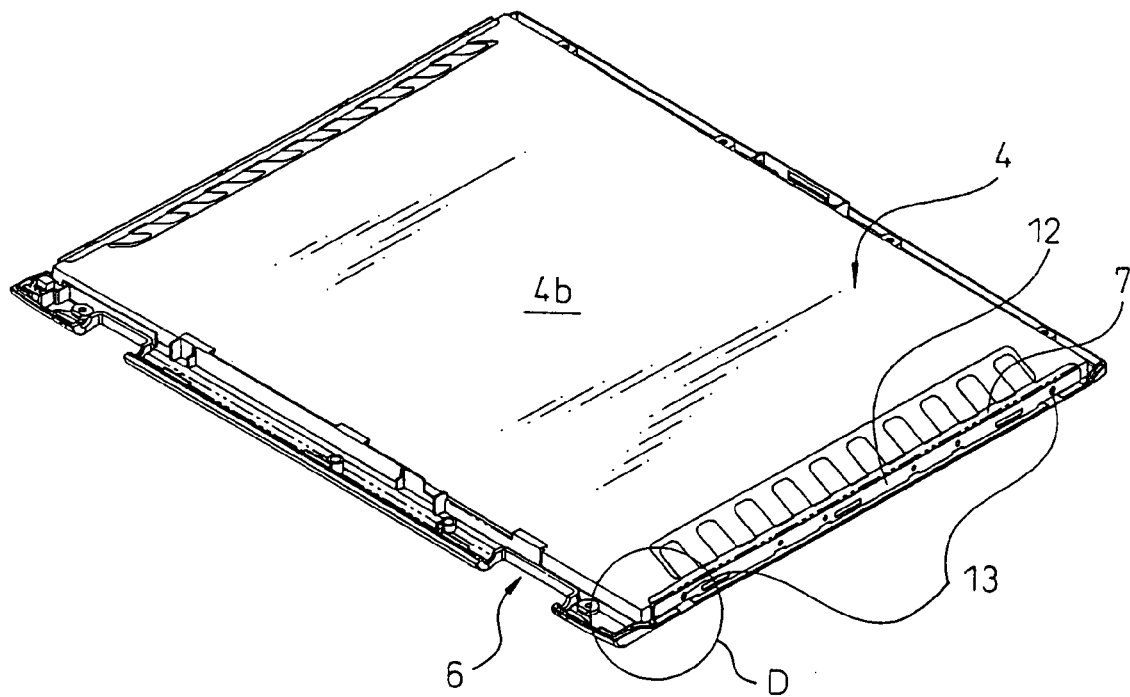
Figure 12:
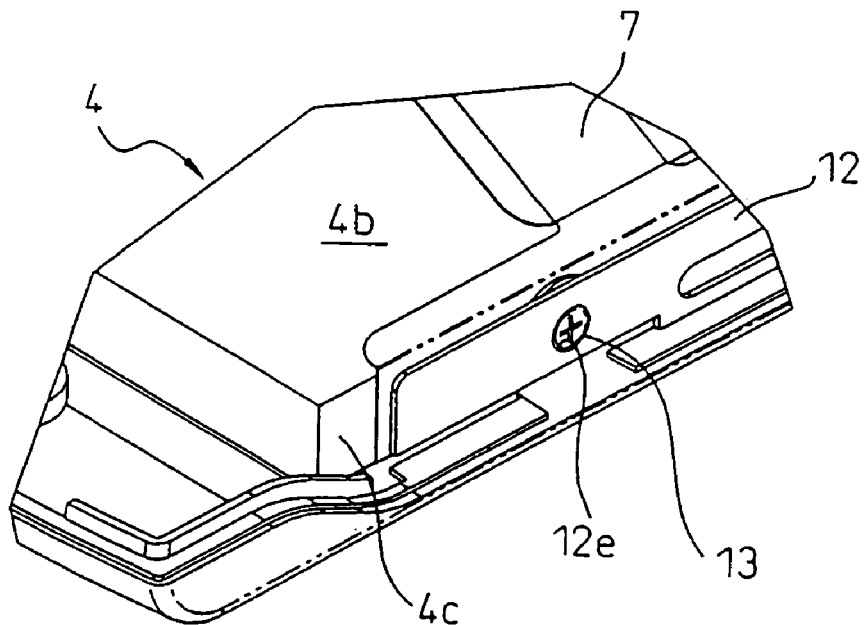
Figure 13:
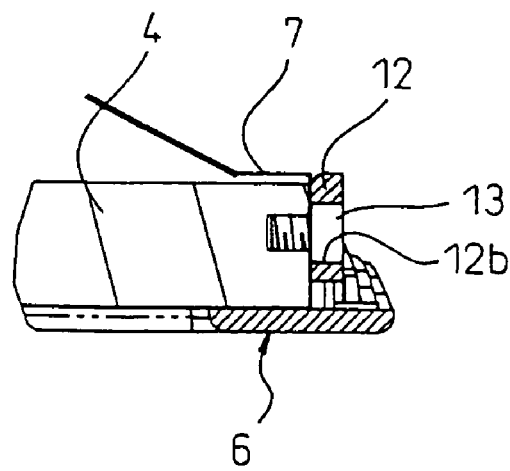
Figure 14:
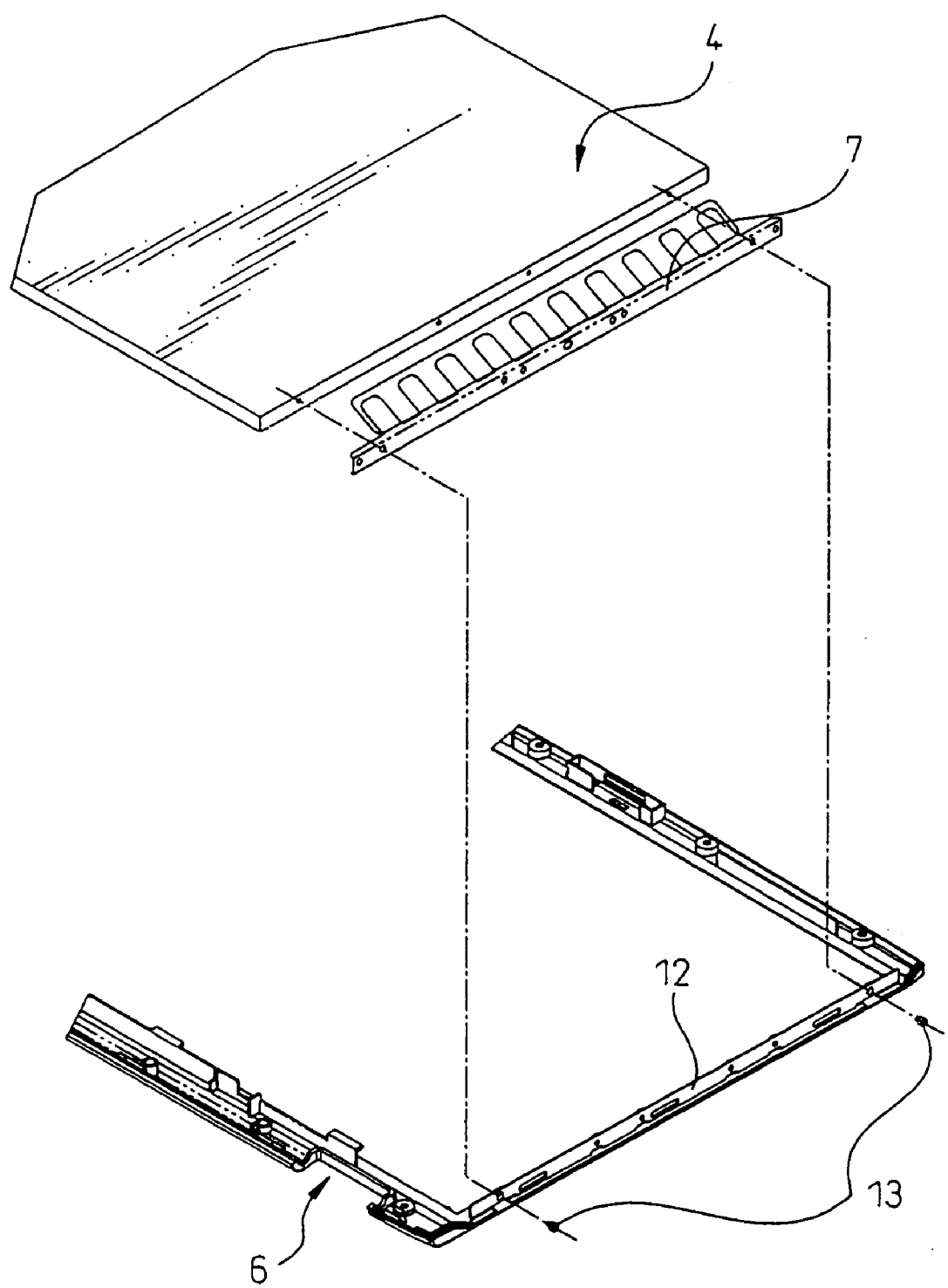

FIGS. 11 to 14 are views showing the fourth embodiment of the present invention. FIG. 11 is a perspective view showing a state in which the liquid crystal display unit 4 is fixed to the front cover 6, wherein the view is taken from the back side of the liquid crystal display unit 4. FIG. 12 is an enlarged perspective view showing a fixing portion indicated by reference mark D in FIG. 11. FIG. 13 is a sectional view of the fixing portion. FIG. 14 is an exploded view showing a state in which the liquid crystal display unit 4, flexible plate 7 and front cover 6 have not been assembled yet.

In the same manner as that of the first to the third embodiments, on the front cover 6 composing one portion of the housing, there are provided a pair of wall sections 12 which are opposed to the walls on both sides of the liquid crystal display unit 4 in such a manner the rising wall sections 12 are adjacent to the walls on both sides of the liquid crystal display unit 4. Accordingly, the liquid crystal display unit 4 can not be moved in the lateral direction (direction X) on the plane by the pair of rising wall sections 12.

Four screws 13, which are respectively arranged on the right and the left and on the upper and the lower side, respectively, are screwed to both side walls 4c of the liquid crystal display unit 4 while the flexible plates 7, which are functional parts, are being interposed between the screws 13 and the respective side walls 4c. In the same manner as that of a common screw, the screw stem portion of each screw 13 is screwed onto the side of the liquid crystal display unit 4, and only the head portion of each screw 13 is protruded from the side of the liquid crystal display unit 4.

At a position in the wall section 12 of the front cover 6 corresponding to the head portion of the screw 13, there is provided a through-hole 12e. The head portion of this screw 13 is idly engaged in this through-hole 12e. Specifically, as shown in the exploded view of FIG. 14, the wall section 12 of the front cover 6 is not rigidly fastened to the liquid crystal display unit 4 together with the flexible plate 7 but the head portion of the screw 13 is only engaged in the through-hole 12e. It is preferable that the dimensions of the through-hole 12e in the directions Y and Z are diameters made to be identical with those of the head portion of the screw 13. However, it is possible that either one of the dimensions in the Y or Z direction can be made longer than the other.

Accordingly, as shown in FIG. 14, when the screw 13 is inserted from the outside of the wall section 12 of the front cover 6, it can be fastened to the liquid crystal display unit 4, however, the screw 13 is not rigidly fixed to the front cover 6.

As described above, when the head portion of the screw 13 is loosely engaged in the through-hole 12e of the wall section 12, the head portion of the screw 13 is confined in the through-hole 12e, so that it can not come out. Accordingly, movement of the liquid crystal display unit 4 with respect to the front cover 6 in the thickness direction (direction Z) and the vertical direction (direction Y) can be prevented. In the case where the dimension of the through-hole 12e in the direction Y of the head portion of the screw 13 is longer, a movement in the Y direction of the liquid crystal display unit 4 is regulated by the flexible plate 7.

The thickness of the head portion of the screw 13 in the axial direction, which is loosely engaged in the through-hole 12e, is identical with or smaller than the thickness of the wall section 12 of the front cover 6 in which the U-shaped groove 12d (FIGS. 9 and 10) is provided in the same manner as in the third embodiment. Due to the foregoing, the head portion of the screw 13 is not protruded outside from the opposite face of the wall section 12, which is the same as the third embodiment described before.

Figure 15:
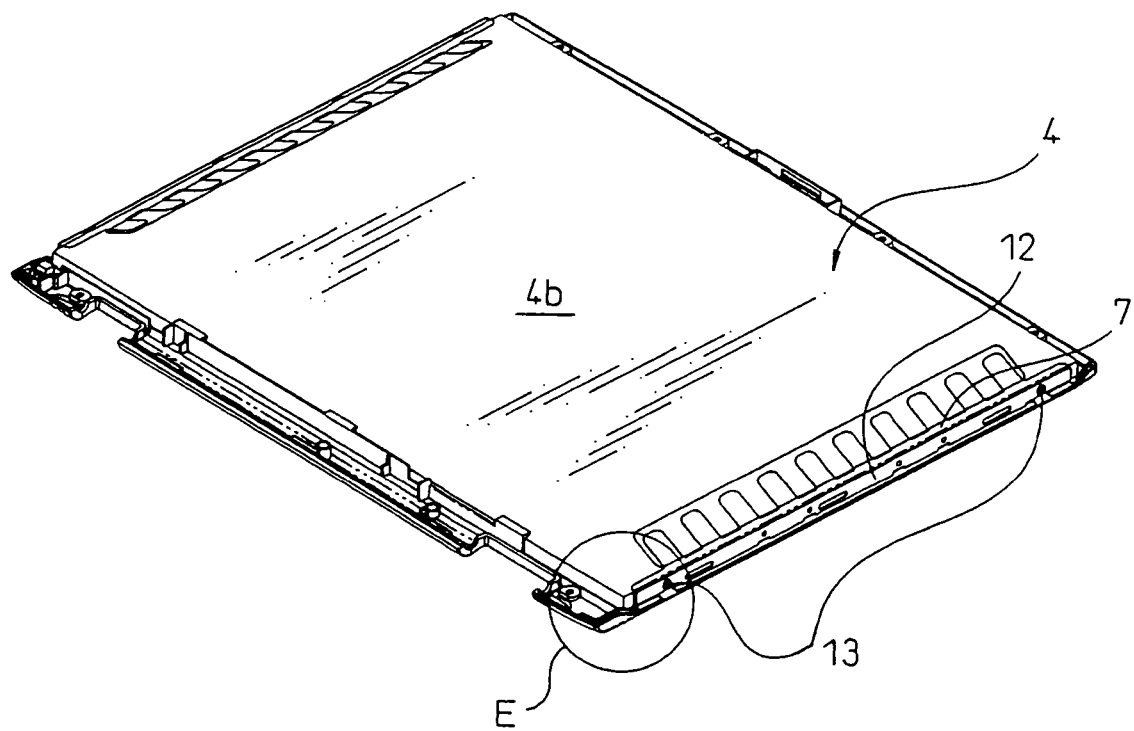
Figure 16:
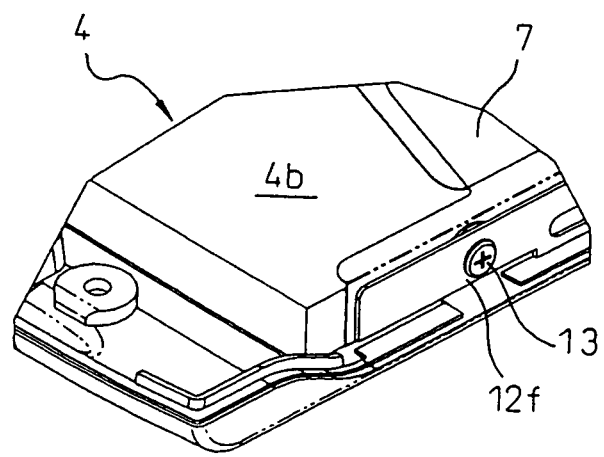
Figure 17:
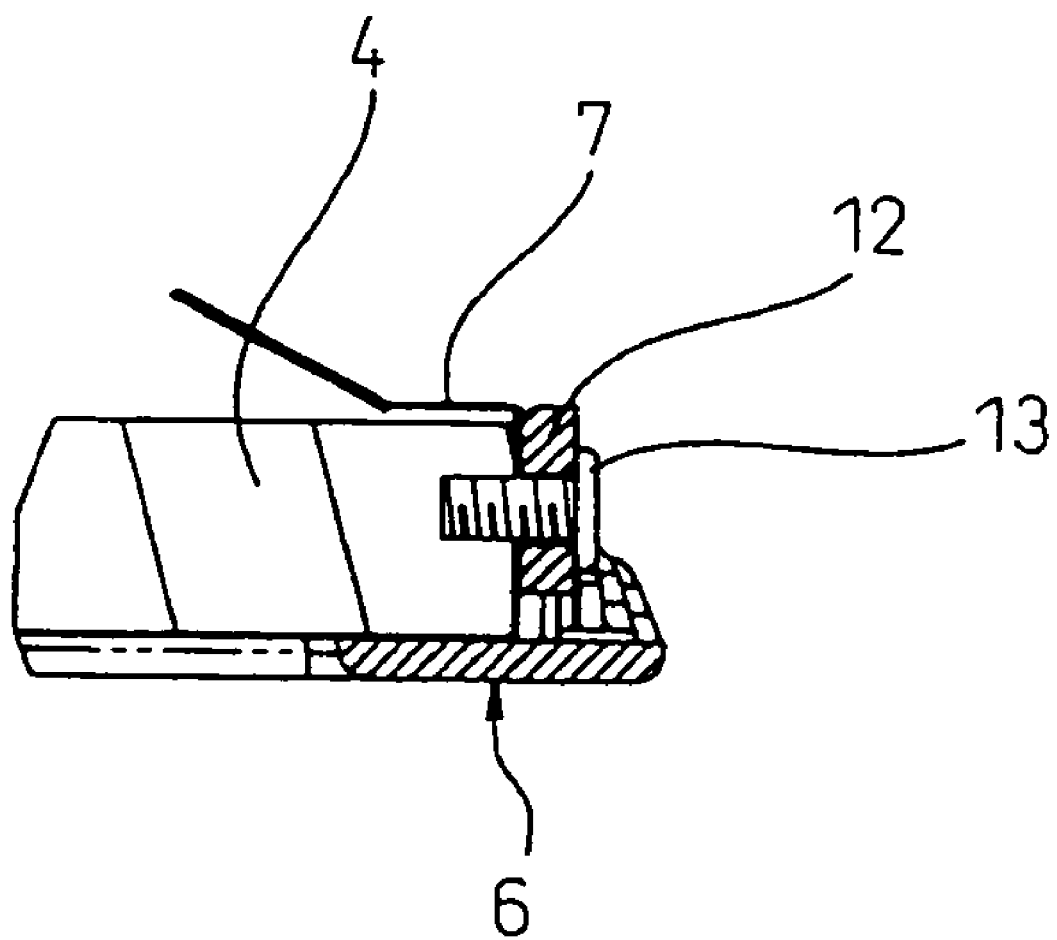

FIGS. 15, 16 and 17 are views showing a comparative example. In this comparative example, different from the fourth embodiment described above, the screw 13 is not loosely engaged with respect to the wall section 12 of the front cover 6 but the screw 13 and the wall section 12 of the front cover 6 are tightly fastened to each other. FIG. 15 is a perspective view showing a state in which the liquid crystal display unit 4 is fixed to the front cover 6, wherein the view is taken from the reverse side of the liquid crystal display unit 4. FIG. 16 is an enlarged perspective view showing a fixing portion indicated by reference mark E in FIG. 15. FIG. 17 is a sectional view of the fixing portion.

On the front cover 6 composing one portion of the housing, there are provided a pair of wall sections 12 which are opposed to walls on both sides of the liquid crystal display unit 4 in such a manner the rising wall sections 12 are adjacent to the walls on both sides of the liquid crystal display unit 4. Accordingly, the liquid crystal display unit 4 cannot be moved in the lateral direction (direction X) on the flat face by the pair of rising wall sections 12, which is the same as the embodiment described above.

Four screws 13, which are respectively arranged on the right and the left and on the upper and the lower side, are screwed to both side walls 4c of the liquid crystal display unit 4 while the flexible plates 7, which are functional parts, are interposed between the screws 13 and both side walls 4c, so that the screws 13 are fastened together with the screw through-holes 12f of the wall sections 12 of the front cover 6. Accordingly, the liquid crystal display unit 4 is fixed to the front cover 6 and is prevented from moving in the thickness direction, the vertical direction and the lateral direction (direction Y).

However, the head section of each screw 13 protrudes outside from the wall section 12 of the front cover 6. Corresponding to the protrusion, it becomes necessary to provide a space between the housing and the liquid crystal display unit 4. For the above reasons, it is impossible to sufficiently accomplish the object of extending the display portion of the liquid crystal display unit with respect to the frame portion of the housing as large as possible.

In each embodiment of the invention and the comparative example, after the liquid crystal display unit 4 has been fixed to the front cover 6 by a method described above, the liquid crystal display unit 4 is fixed to the back cover 5, which composes a portion of the housing, together with the front cover 6. In this case, the back cover 5 and the front cover 6 are combined with each other in such a manner that a pawl or hook provided in one of the back cover 5 and the front cover 6 is engaged with an engaging hole, groove or cutout provided in the other.

As explained above, according to the present invention, in the case where a liquid crystal display unit is mounted on a housing such as a front cover, it is possible to reduce a space between the liquid crystal display unit and the housing. Accordingly, a region of the display portion of the liquid crystal display unit with respect to a frame portion of the housing can be increased, and a compact display device having a sufficiently high function can be provided.

Referring to the accompanying drawings, the embodiments of the present invention were explained above with the comparative example. However, it should be noted that the present invention is not limited to the above specific embodiments, but variations may be made by one skilled in the art without departing from the spirit and scope of the invention described in the accompanying claims.

The invention claimed is:

1. A computer comprising a computer body and a display device, said display device being selectively moveable between opened and closed positions with respect to the computer body and comprising:
   a plate-shaped display unit having respective side walls;
   a fixing structure fixing the display unit to the housing and including a Z-direction holding member holding the display unit in the thickness direction and an X-direction holding means and a Y-direction holding means for respectively, holding the display unit in an X-direction and a Y-direction, respectively, perpendicular to the X-direction;
   at least one of the X-direction holding member and the Y-direction holding member being composed of wall sections, which are opposed to each other, of the housing adjacent to respective side walls of the display unit;
   a protruding section being formed which protrudes from the side wall of the display unit to the wall section;
   the wall section having a cutout engaging with the protruding section at a position of the wall section corresponding to the protruding section; and
   the other of the X-direction holding member and the Y-direction holding member being composed by engagement of the protruding section with the cutout.

2. A computer and a plate-shaped display unit according to claim 1, wherein the protruding section is a pawl section in which a portion of a plate fixed to the side wall of the display unit is protruded to the wall section side, and pawl section is engaged with the cutout.

3. A computer and a plate-shaped display unit according to claim 1, wherein the plate is composed of a metal fitting, the section of which is an L-shape, and an L-shape portion of the metal fitting composes the pawl section.

4. A computer and a plate-shaped display unit according to claim 1, wherein the protruding section is a head portion of a screw which is screwed into the side wall of the display unit, the cutout is a U-shaped groove provided in the wall section, and the head portion of the screw is idly loosely engaged in the U-shaped groove.

5. A computer and a plate-shaped display unit according to claim 4, wherein the thickness of the head portion of the screw in the axial direction, which is engaged in the U-shaped groove, is identical with or smaller than the thickness of a portion of the wall section in which the U-shaped groove is provided so that the head portion of the screw is not protruded from an opposite side face of the wall section.

6. A computer and a plate-shaped display unit according to claim 1, wherein the housing is provided with a frame-shaped front cover surrounding a periphery of the display unit, and the wall section is composed of a rising wall of the front cover.

7. A computer and a plate-shaped display unit, comprising:
   a housing;
   a plate-shaped display unit having respective side walls; and
   a fixing structure for fixing the display unit to the housing the fixing structure including a Z-direction holding member for holding the display unit in the thickness direction and also including an X-direction holding member and Y-direction holding member for holding the display unit in the X-direction and the Y-direction, respectively perpendicular to the X-direction;
   at least one of the X-direction holding member and the Y-direction holding member being composed of wall sections, which are opposed to each other, of the housing adjacent to respective side walls of the display unit;
   a protruding section being formed which protrudes from the side wall of the display unit to the wall section; the wall section having a through-hole engaging with the protruding section at a position of the wall section corresponding to the protruding section; and
   the Z-direction holding member and the other of the X-direction holding member and the Y-direction holding member being composed by engagement of the protruding section with the through-hole.

8. A computer and a plate-shaped display unit according to claim 7, wherein the protruding section is a pawl section in which a portion of a plate fixed to the side wall of the display unit is protruded to the wall section side, and the pawl section is engaged in the through-hole.

9. A computer and a plate-shaped display unit according to claim 7, wherein the protruding section is composed of a head section of a screw which is screwed in the display unit, and the head section of the screw is loosely engaged in the through-hole provided in the wall section.

10. A computer and a plate-shaped display unit according to claim 9, wherein the thickness of the head portion of the screw in the axial direction, which is engaged in the through-hole, is identical with or smaller than the thickness of a portion of the wall section in which the through-hole is provided so that the head portion of the screw is not protruded from an opposite side face of the wall section.

11. A computer and a plate-shaped display unit according to claim 8, wherein the plate is fixed to the wall section with a screw.

12. A computer and a plate-shaped display unit according to claim 11, wherein the plate is fixed to the wall section with a screw at a position where the plate does not overlap the wall section.

13. A computer and a plate-shaped display unit according to claim 7, wherein the housing is provided with a frame-shaped front cover surrounding a periphery of the display unit, and the wall section is composed of a rising wall of the front cover.

* * * * *